UNITED STATES PATENT OFFICE.

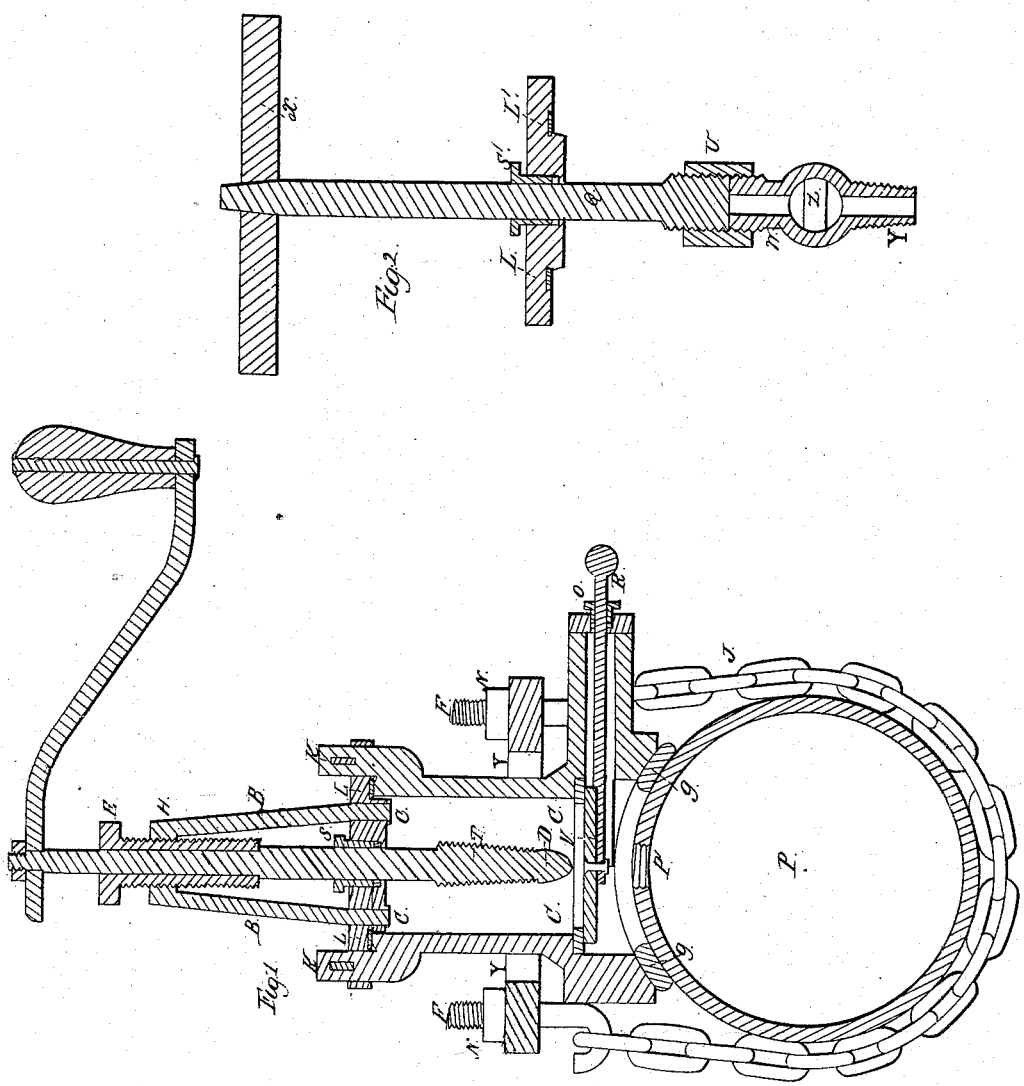

H. ARIEL NORRIS, OF NEW YORK, N. Y.

MACHINE FOR BORING AND TAPPING WATER AND OTHER PIPES WHILE UNDER HYDROSTATIC PRESSURE.

Specification forming part of Letters Patent No. 2,681, dated June 22, 1842; Reissued August 11, 1842, No. 45.

*To all whom it may concern:*

Be it known that I, H. ARIEL NORRIS, of the city, county, and State of New York, have invented a new and useful machine for boring and tapping water or other pipes while under hydrostatic pressure and for attaching thereto lateral or service pipes; and I do hereby declare that the following is a full and accurate description of the construction and operation of the same, reference being had to the annexed drawings, making a part of this specification, in which—

Figure 1 is a vertical section of the whole machine attached to a pipe ready for boring; and Fig. 2 is an instrument for inserting the ferulet or brass tube to which is attached the lateral pipe.

In order to bore the pipe P, a circular cushion or gromet $g$ $g$ is made to surround the spot to be drilled; the curved bottom of the machine is then laid nicely over the gromet and the whole strongly pressed against the pipe by the chain J, or other band, passing around the pipe and drawn tight by turning the nuts N, N, of the screw bolts F F let into the yoke Y Y which surrounds the box. The lower valve V is now opened which uncovers the pipe to the action of the drill, the point of which D is now brought down to the pipe by a screw E working into the cross-head H of two braces B B let into the lid L L of the machine; as soon as the drill has perforated the pipe, the water rushes through the opening P' and fills the chamber C C C C of the machine, but cannot pass beyond; for the lid L L is accurately fitted to the top of the chamber, and is confined in its place by two keys K K or by screws or wedges properly arranged. A stuffing box S, prevents the escape of water around the drill-shaft; another O prevents the same around the valve rod; and the gromet prevents the escape of water below the machine. Above the point of the drill is a tap T with which a screw thread is cut in the hole drilled, which thread corresponds with that cut upon the bottom of the ferulet. When it is not deemed advisable to use a screw, the ferulet is left smooth at bottom and the tap is replaced with a plain reamer.

The drill is now raised to allow the valve to be closed; which being done, the keys K K are knocked out, the lid L L removed with its attached drill, and another lid L' L' Fig. 2 is put on in its place. This lid is also provided with a stuffing box S' through which passes a shaft Q to which is attached the ferulet W Y by means of a coupling socket U into which both are screwed. When this lid is in its place, by turning the cross head X of the shaft Q, the lower end Y of the ferulet is screwed into the tapped opening P' of the pipe, care being taken previously to turn the spigot Z of the ferulet so that no water can escape. The shaft Q may now be unscrewed from the ferulet, the chain may be slackened and the machine removed. A screw-joint, solder-joint, or any other joint can be made with the ferulet and the lateral pipe be attached at pleasure.

What I claim as my invention and desire to secure by Letters Patent is—

1. The boring, tapping and making conducting attachments to water or other pipes while under hydrostatic pressure by means of a close chamber; within which the drill, tap and ferulet are operated according to the principles herein set forth; and by which the workman is protected during the work from the flow of water or other fluid from the pipes.

2. I also claim the combination of essential parts, such as the chamber, the lid and the valve, by which that form of machine herein described is made efficient.

H. ARIEL NORRIS.

Witnesses:
   WM. B. AITKEN,
   WM. G. HUNT.

[FIRST PRINTED 1913.]